Mar. 20, 1923.

W. SCHÄFFER 1,448,902

MEANS FOR REGULATING THE SPEED OF ELECTRIC MOTORS

Filed May 3, 1922     3 sheets-sheet 1

Inventor.
Walter Schäffer

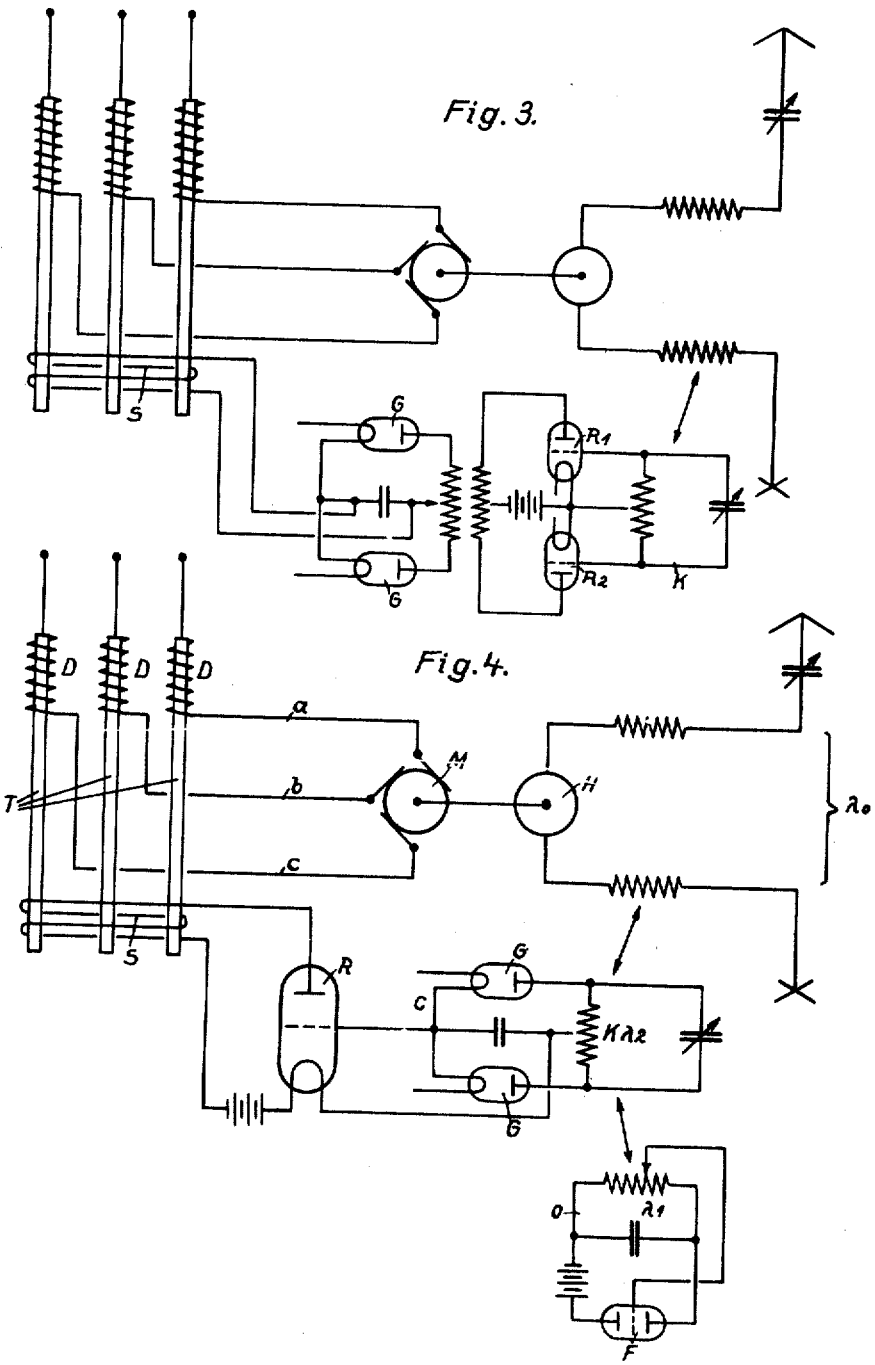

Patented Mar. 20, 1923.

1,448,902

UNITED STATES PATENT OFFICE.

WALTER SCHÄFFER, OF BERLIN, GERMANY.

MEANS FOR REGULATING THE SPEED OF ELECTRIC MOTORS.

Application filed May 3, 1922. Serial No. 558,307.

*To all whom it may concern:*

Be it known that I, WALTER SCHÄFFER, a citizen of Germany, residing at Berlin, Germany, have invented certain new and useful Improvements in Means for Regulating the Speed of Electric Motors, of which the following is a specification.

My present invention relates to an arrangement for regulating the speed of electric motors and differs from previously known arrangements of the same type in that no switch or relay of any kind is employed, and the regulation is effective continuously. This aim is accomplished by supplying alternating current from a generator driven by the motor which is to be regulated to a resonant circuit and by further utilizing the current after it has been rectified and amplified to magnetically control the motor-regulating means, such as the well-known means for varying the field of a direct current motor or the induction of choke coils.

In the drawings,

Figs. 3 and 4 are diagrammatic representations of the circuit arrangements of modified forms of radio transmitters in which the invention may be embodied.

Figure 1:
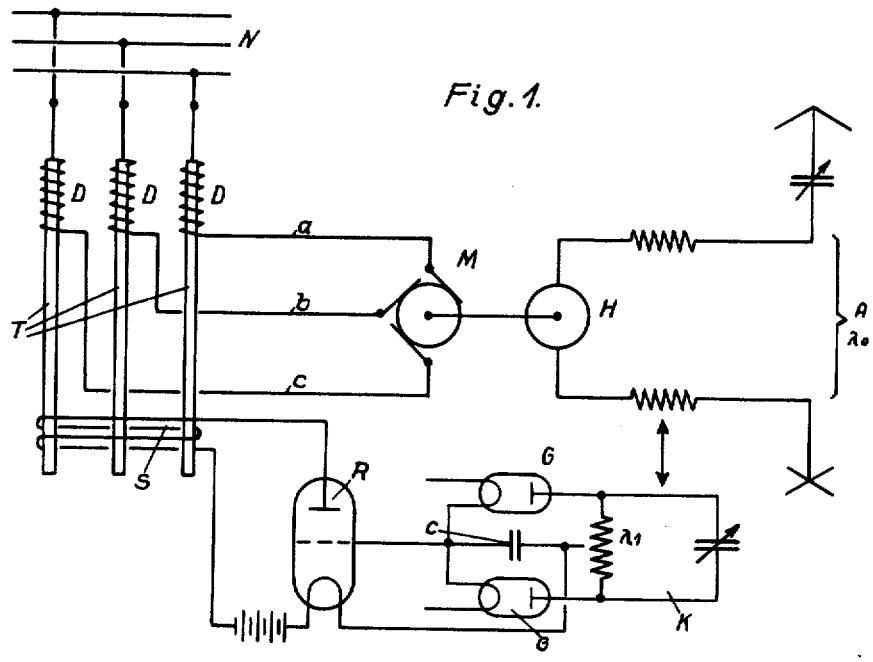
Fig. 1 is a diagrammatic representation of the circuit arrangement of a radio transmitter embodying the invention.

The arrangement shown in Fig. 1 consists of a three phase current motor M which is supplied with current by a three phase system N through the connections $a, b, c$ and which drives a generator H of radio frequency currents. This generator acts on the antenna A which is provided with suitable lengthening coils.

The speed of the motor M is kept constant according to Fig. 1 in the following way:

The antenna is inductively coupled with a tuned circuit K, the energy of which is rectified by the rectifier G. The direct current is taken from the condenser C of the rectifier and led to a vacuum tube R. The connection is such that the grid of the tube R is furnished with positive charges by the direct current. A magnetic coil S inserted in the anode circuit acts upon the cores T of choke coils D the alternating current windings of which are included in the connections $a, b, c$.

Figure 2:
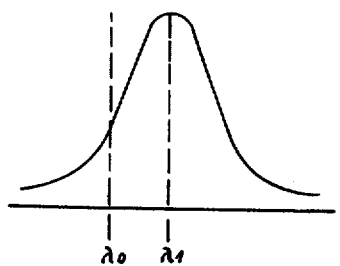
Fig. 2 illustrates graphically the resonance curve of the circuit K of Fig. 1.

The operating principle of the choke coils D consists in opposing a certain resistance to the passage of current through the connections $a, b, c$, which is dependent on the direct current magnetization of their iron cores T. Upon increase of the direct current magnetization of their cores, the resistance of the choke coils is reduced, and thus the motor voltage is heightened, thereby causing the motor to be driven at a greater speed. On the other hand, the voltage and driving speed of the motor are decreased upon weakening of the direct current magnetization. Accordingly, the speed of the motor M can be regulated by suitably controlling the direct current magnetization of the choke coils by means of the coil S. In the use of the connections shown in Fig. 1 this may be effected in the following way: Let it be assumed that the circuit K is tuned to a wave length $\lambda_1$ while the antenna A is tuned to a wave length $\lambda_0$. Furthermore, let it be assumed that the wave length $\lambda_0$ is shorter than the wave length $\lambda_1$. The resonance curve of the circuit K, Fig. 2, shows that the energization of the circuit K is increased if the wave length of the energy exciting it increases and approaches the value $\lambda_1$, i. e. if the speed of the motor M tends to decrease. In the reverse case, the opposite takes place. It is desirable to dimension the electrical proportions in such a way that variation of $\lambda_1$ causes a more than proportional change in the speed of the motor.

Instead of causing the amplified direct current to act upon the choke coils D, it is, of course, possible to employ other methods of magnetic regulation, for instance, acting directly upon the rotor or upon a special additional machine driven by a synchronous motor. Furthermore, it is possible to excite the circuit K by another auxiliary frequency instead of the antenna frequency $\lambda_0$, the auxiliary frequency being specially produced for the regulation by the motor M, or by radio frequency generator H, or by a special machine driven by the motor M.

The arrangement shown in Fig. 3 differs from that of Fig. 1, in that the energy of the circuit K is first amplified by two tubes $R_1$ and $R_2$ having their output circuits arranged in parallel, and then the amplified oscillations are rectified by the rectifier G for the purpose of controlling the coil S. The effect of this arrangement is the same as that of Fig. 1, and the arrangement is no more expensive than that of Fig. 1, as smaller tubes $R_1$ and $R_2$ can be used instead of the transmitting tube R. According to the arrangement shown in Fig. 4, in order to control the motor regulating means a beat $\lambda_3$ is used which is obtained by superposing upon the wave $\lambda_0$ an absolutely constant auxiliary wave $\lambda_1$ which is produced by the tube F in the circuit O.

The circuit K is tuned to a wave $\lambda_2$ approximate to the beat-wave $\lambda_3$. The energy of the circuit K after being rectified and amplified, is supplied as above described to the windings S of the choke coils.

A variation of $\lambda_0$, due to a change in the speed of the motor M and the generator H, causes a variation of the beat wave $\lambda_3$ and therefore also an increase or decrease in the energy of the circuit K and the direct current magnetization of the choke coils. In this way the speed of the motor M and the wave length $\lambda_0$ can be regulated.

It is also advantageous in the use of the arrangements shown in Figs. 3 and 4 to work not with the generator wave or antenna wave, but as already described above in connection with Fig. 1 with an extra wave which depends on the speed of the motor and which is preferably chosen smaller than the operating wave. In order to make the regulation as accurate as possible in the use of the arrangement shown in Fig. 4, it is advisable to give the superposed wave $\lambda_1$ a comparatively small value and the wave $\lambda_0$ as large a value as possible, because in this case the superposition-tone consists of beats of higher frequency, so that the resonance is sharper.

Figure 5:
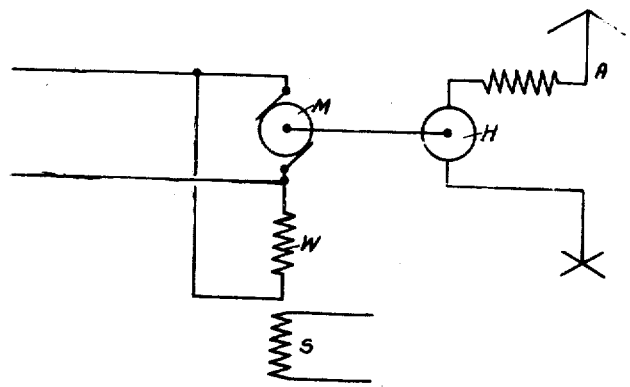
Figs. 5 and 6 are diagrammatic representations of circuit arrangements showing how the invention may be applied to the control of direct current motors.
Figure 6:
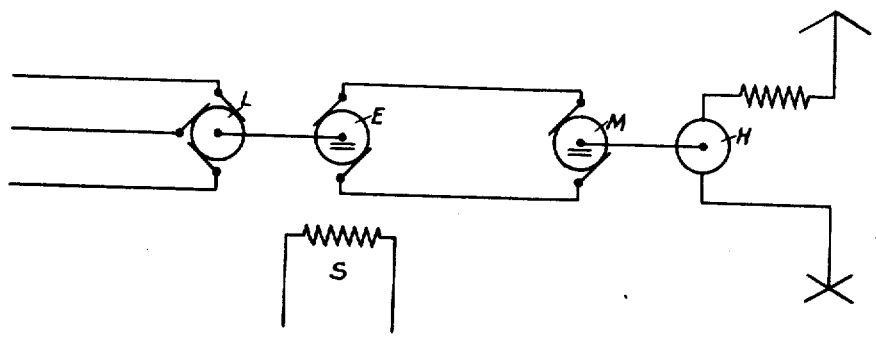

While in the preceding description, the method of regulation is treated only with regard to alternating current motors, the application of this invention to the control of direct current motors will now be explained. As shown in Fig. 5, M is a direct current motor, H the radio frequency generator and A the antenna. The winding S which is provided with current according to one of the arrangements shown in Figs. 1, 3 and 4 directly controls the field winding W of the motor M. If the excitation of the coil S is increased, the field of the motor M is strenghtened and its speed is diminished, while the reverse occurs if the excitation of the coil S is decreased. In order to obtain the desired regulation $\lambda_0$ must lie on the drooping branch of the resonance curve i. e. $\lambda_0$ must be larger than $\lambda_1$. The regulation can be accomplished in a similar manner according to the arrangement shown in Fig. 6. In this case a dynamo E which is driven by a three phase motor L supplies the motor M with current. It is suitable in such an arrangement to control the excitation of the dynamo E by the coil S.

I claim:

1. In an arrangement of the class described, an alternating frequency generator, a resonant circuit coupled with the generator and tuned to a somewhat different frequency, rectifying means associated with the resonant circuit, a three-element tube having the current from the rectifying means applied to its grid, and means for utilizing the output from the three-element tube to control the frequency of the generator.

2. In an arrangement of the class described, an alternating frequency generator, a resonant circuit coupled with the generator and tuned to a somewhat different frequency, vacuum tube means for rectifying and amplifying the current from the resonant circuit, impedance devices for controlling the frequency of the generator, and a direct connection between the output circuit of the rectifying and amplifying means and the impedance devices for varying the impedance of said devices by the rectified and amplified current to control the frequency of the generator.

3. In an arrangement of the class described, a motor, an alternating frequency generator driven by the motor, a resonant circuit coupled with the generator and tuned to a somewhat different frequency, means for rectifying and amplifying the current from the resonant circuit, means for controlling the supply of current to the motor and, consequently, the frequency of the generator, and means in the output circuit of the rectifying and amplifying means and directly connected to the controlling means for maintaining the speed of the motor constant.

4. In an arrangement of the class described, a motor, an alternating frequency generator driven by the motor, a resonant circuit coupled with the generator and detuned with respect thereto, variable impedance devices in the current supply circuit of the motor, vacuum tube devices for rectifying and amplifying the current from the resonant circuit, and means in the output circuit of the vacuum tube devices and directly connected to the impedance devices for controlling the impedance of said devices and thereby controlling the speed of the motor.

5. In an arrangement of the class described, a motor, an alternating frequency generator driven by the motor, a resonant circuit coupled with the generator and detuned with respect thereto, choke coils for controlling the supply of current to the motor, a winding energized by current from the resonant circuit for varying the magnetization of the choke coils, and vacuum tube devices intermediate between the resonant circuit and said winding for rectifying and amplifying the current from the resonant circuit.

6. In an arrangement of the class described, a motor, an alternating frequency generator driven by the motor, a resonant circuit coupled with the generator, means coupled with the resonant circuit for supplying a constant frequency current thereto of a frequency different from that of the generator so as to produce a beat wave in the resonant circuit, said resonant circuit being slightly detuned with respect to the frequency of the beat wave, variable impedance means in the current supply circuit of the motor, and means for utilizing the current from the resonant circuit to vary the resistance of said means and thereby control the speed of the motor and the frequency produced by the generator.

7. In an arrangement of the class described, a motor, an alternating frequency generator driven by the motor, a resonant circuit coupled with the generator, means coupled with the resonant circuit for supplying a constant frequency current thereto of a frequency different from that of the generator so as to produce a beat wave in the resonant circuit, said resonant circuit being slightly detuned with respect to the frequency of the beat wave, iron core choke coils in the current supply circuit of the motor, vacuum tube means for rectifying and amplifying the current from the resonant circuit, and a winding in the output circuit of the rectifying and amplifying means for varying the magnetization of the cores of the choke coils so as to control the speed of the motor and the frequency produced by the generator.

In testimony whereof I affix my signature in presence of two witnesses.

WALTER SCHÄFFER.

Witnesses:
MAX ABRAHAMSOHN,
ERNST WELKY.